US009986208B2

(12) United States Patent
Chao et al.

(10) Patent No.: US 9,986,208 B2
(45) Date of Patent: May 29, 2018

(54) SYSTEM AND METHOD FOR DETERMINING LOCATION OF A DEVICE USING OPPOSING CAMERAS

(75) Inventors: Hui Chao, San Jose, CA (US);
Saumitra M. Das, San Jose, CA (US);
Sameera Poduri, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 636 days.

(21) Appl. No.: 13/360,372

(22) Filed: Jan. 27, 2012

(65) Prior Publication Data

US 2013/0194428 A1    Aug. 1, 2013

(51) Int. Cl.

| | |
|---|---|
| *H04N 7/18* | (2006.01) |
| *G01C 21/20* | (2006.01) |
| *H04W 4/04* | (2009.01) |
| *G01S 5/16* | (2006.01) |
| *G06T 7/73* | (2017.01) |
| *H04W 4/02* | (2018.01) |

(52) U.S. Cl.
CPC .............. *H04N 7/181* (2013.01); *G01C 21/20* (2013.01); *G01S 5/16* (2013.01); *G06T 7/74* (2017.01); *H04W 4/046* (2013.01); *G06T 2207/10016* (2013.01); *H04W 4/02* (2013.01)

(58) Field of Classification Search
CPC ........ G01C 21/20; H04W 4/02; H04W 4/046; H04N 7/181; G06T 7/0044; G06T 2207/10016; G01S 5/16
USPC ........................................................ 348/159
See application file for complete search history.

(56) References Cited

U.S. PATENT DOCUMENTS

| | | | | |
|---|---|---|---|---|
| 5,259,037 | A | * | 11/1993 | Plunk .............................. 382/154 |
| 5,699,444 | A | * | 12/1997 | Palm .............................. 382/106 |
| 5,870,136 | A | * | 2/1999 | Fuchs et al. .................... 348/42 |
| 6,895,126 | B2 | * | 5/2005 | Di Bernardo et al. ........ 382/284 |

(Continued)

FOREIGN PATENT DOCUMENTS

| | | |
|---|---|---|
| EP | 1796039 A2 | 6/2007 |
| JP | 2003111128 A | 4/2003 |

(Continued)

OTHER PUBLICATIONS

Hasegawa. "JP 2004-191339 Translation". Jul. 2004.*

(Continued)

*Primary Examiner* — Zhihan Zhou
(74) *Attorney, Agent, or Firm* — Berkeley Law & Technology Group, LLP

(57) ABSTRACT

System and method for determining location of a device using opposing cameras are disclosed. In one embodiment, the method includes activating a front-facing camera and a back-facing camera of the device, capturing a first pair of images from a first orientation using the front-facing camera and the back-facing camera, where the first pair of images includes a first front image and a first back image, monitoring the device being rotated to a second orientation, capturing a second pair of images from the second orientation using the front-facing camera and the back-facing camera, where the second pair of images includes a second front image and a second back image, and determining a location of the device using the first pair of images and the second pair of images.

37 Claims, 11 Drawing Sheets

(56) References Cited

U.S. PATENT DOCUMENTS

| | | | |
|---|---|---|---|
| 6,990,219 B2* | 1/2006 | Morimura | G06K 9/00087 |
| | | | 340/5.53 |
| 7,508,444 B1* | 3/2009 | Napoli | H04N 5/232 |
| | | | 348/333.01 |
| 8,509,488 B1* | 8/2013 | Enge et al. | 382/106 |
| 9,031,809 B1* | 5/2015 | Kumar | G01C 21/165 |
| | | | 702/150 |
| 2005/0046740 A1 | 3/2005 | Davis | |
| 2005/0270368 A1* | 12/2005 | Hashimoto | 348/61 |
| 2007/0014347 A1* | 1/2007 | Prechtl et al. | 375/240.01 |
| 2009/0169055 A1* | 7/2009 | Ishikawa | 382/104 |
| 2010/0110068 A1* | 5/2010 | Yamauchi et al. | 345/419 |
| 2010/0250136 A1 | 9/2010 | Chen | |
| 2011/0140841 A1* | 6/2011 | Bona | G06K 19/06187 |
| | | | 340/5.83 |
| 2012/0113228 A1* | 5/2012 | Konno et al. | 348/47 |
| 2013/0050394 A1* | 2/2013 | Zhou | 348/14.02 |
| 2013/0050432 A1* | 2/2013 | Perez et al. | 348/47 |
| 2014/0293016 A1 | 10/2014 | Benhimane et al. | |
| 2014/0354822 A1 | 12/2014 | Chao et al. | |
| 2015/0161476 A1 | 6/2015 | Kurz et al. | |

FOREIGN PATENT DOCUMENTS

| | | | |
|---|---|---|---|
| JP | 2004191339 A | | 7/2004 |
| JP | 2008502206 A | | 1/2008 |
| JP | 2009145061 A | * | 7/2009 |
| WO | 2006035476 A1 | | 4/2006 |

OTHER PUBLICATIONS

International Search Report and Written Opinion—PCT/US2013/022527—ISA/EPO—May 3, 2013.

Ravi, et al., "Indoor localization using camera phones" Dept. of Computer Science, Rutgers University, Piscataway, NJ, 2005, 16 pages.

Tollmar, et al., "IDeixis—Image-based Deixis for Finding Location-Based Information" MIT CSAIL, Cambridge, MA, In Proc. Mobile HCI, 2004, 14 pages.

* cited by examiner

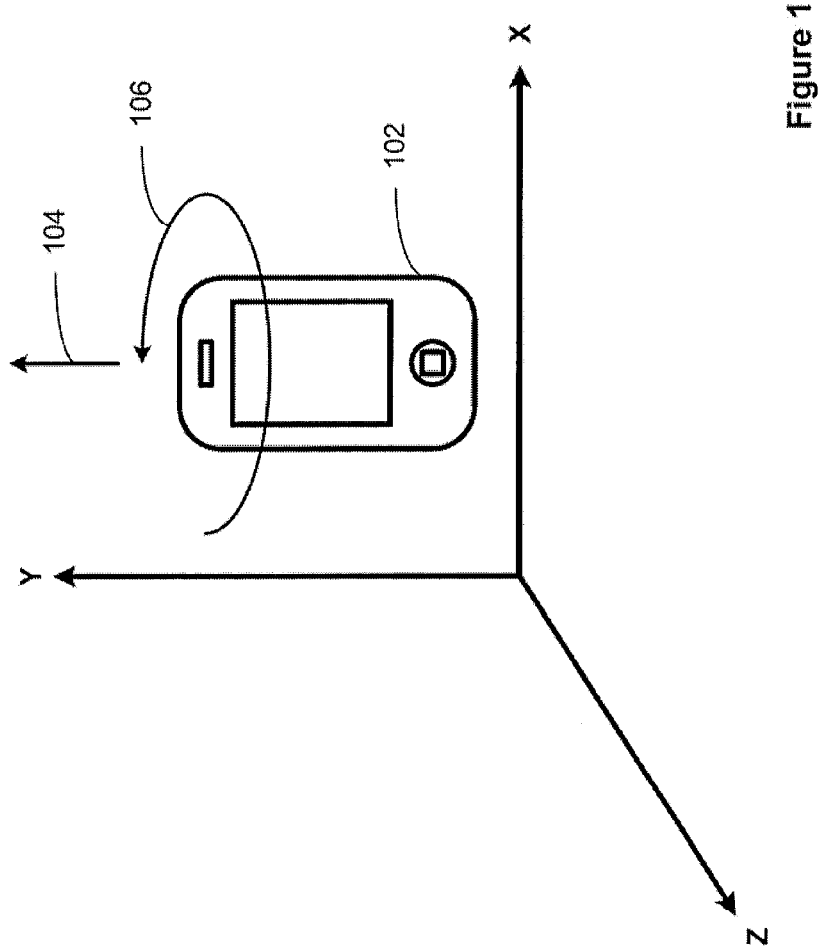

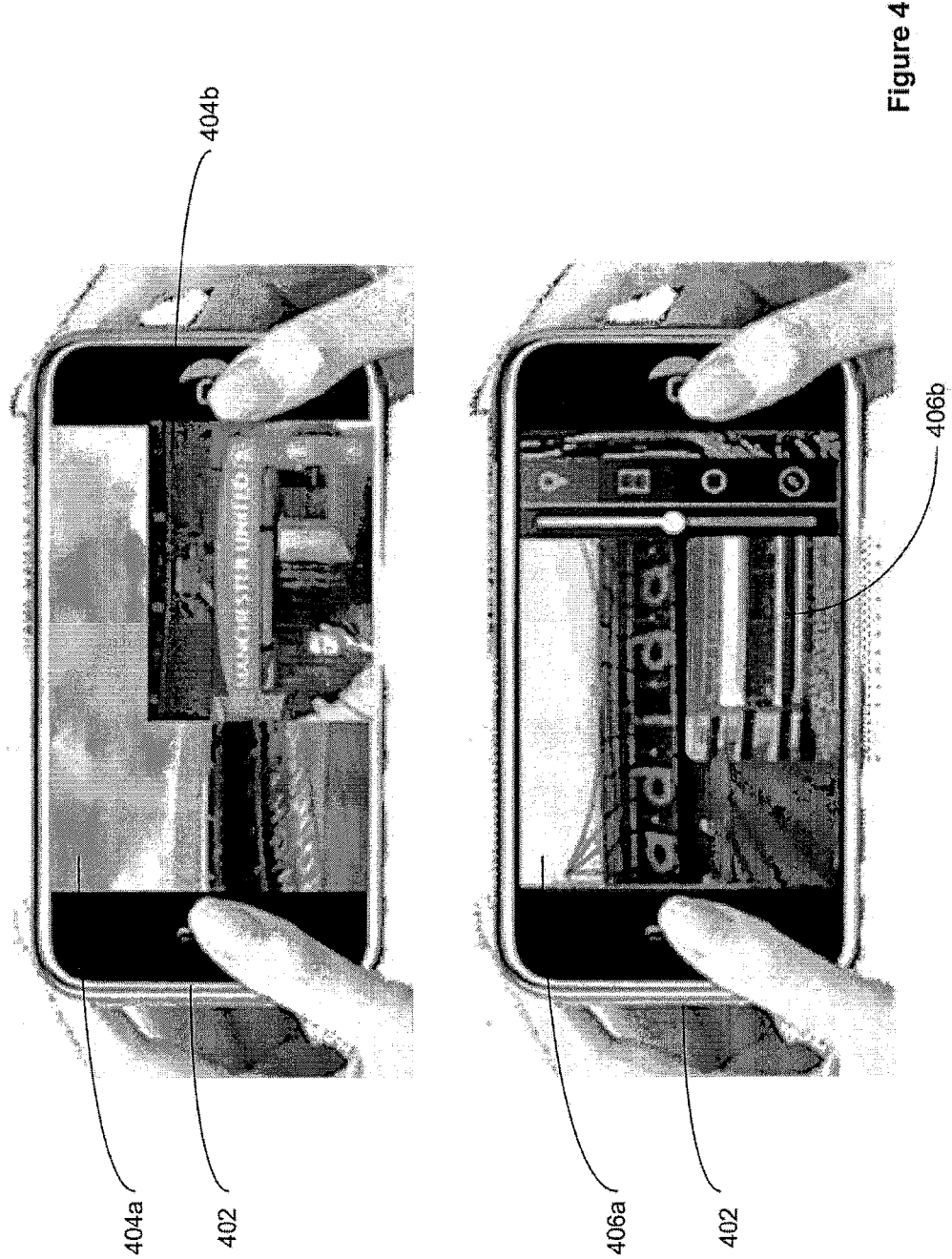

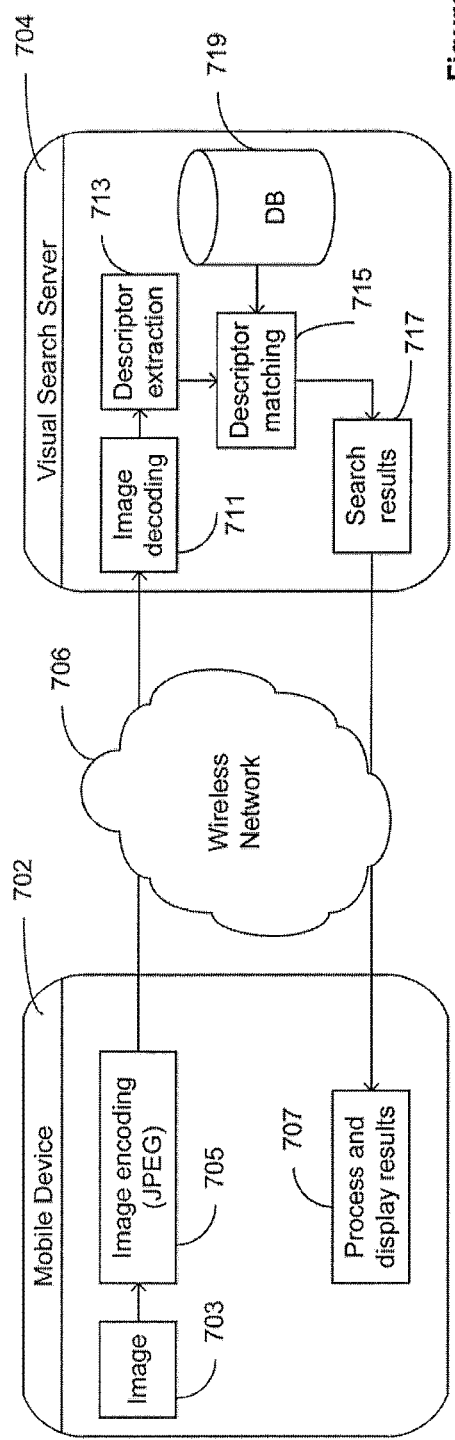
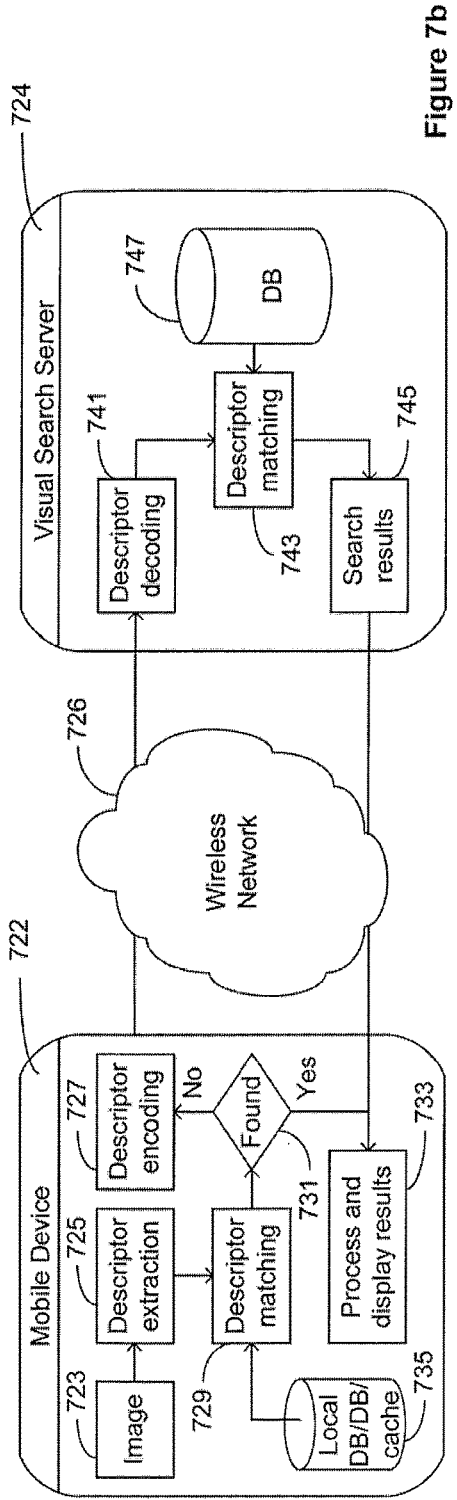

SYSTEM AND METHOD FOR DETERMINING LOCATION OF A DEVICE USING OPPOSING CAMERAS

FIELD

The present disclosure relates to the field of device positioning. In particular, the present disclosure relates to system and method for determining location of a device using opposing cameras.

BACKGROUND

Vision based matching for landmarks has been widely studied and applied in the field of visual search. For example, for an indoor venue, images around an indoor venue can be collected. For each image, scale-invariant feature transform (SIFT) features can be computed and stored in a database (DB). Each image in the DB has associated location information. This information can be mapped to a location or an area on the venue map. A query image captured in the venue can be compared again images in DB based on feature matching. Its location can therefore be determined and mapped. However, conventional methods have not taken advantage of newer devices that are equipped with dual cameras.

Therefore, there is a need for system and method of determining location of a device using opposing cameras.

SUMMARY

The present disclosure relates to determining location of a device using opposing cameras. According to embodiments of the present disclosure, a method for determining location of a device includes activating a front-facing camera and a back-facing camera of the device, capturing a first pair of images from a first orientation using the front-facing camera and the back-facing camera, where the first pair of images includes a first front image and a first back image, monitoring the device being rotated to a second orientation, capturing a second pair of images from the second orientation using the front-facing camera and the back-facing camera, where the second pair of images includes a second front image and a second back image, and determining a location of the device using the first pair of images and the second pair of images.

The method of activating a front-facing camera and a back-facing camera of the device includes activating the front-facing camera and the back-facing camera of the device with a gesture, where the gesture includes applying one or more user-defined movements of the device. The method of capturing a first pair of images includes capturing the first pair of images simultaneously, or capturing the first pair of images within a predetermined period of time. The method further includes determining information of the first orientation and the second orientation using at least one of accelerometer, gyroscope, and magnetometer.

The method of determining location of the device includes determining a first line connecting locations associated with the first front image and the first back image, determining a second line connecting locations associated with the second front image and the second back image, determining an approximate cross point of the first line and the second line, and identifying the approximate cross point as an estimated location of the device. The method of determining a first line locations associated with connecting the first front image and the first back image includes comparing the first front image with images in a database, where the database stores image features of multiple locations of a venue, identifying approximate location of the first front image, comparing the first back image with the images in the database, identifying approximate location of the first back image, and determining the first line using the approximate location of the first front image and the approximate location of the first back image. The method of comparing the first front image with images in a database includes selecting a first set of images from the database based on the first orientation of the device, where the first set of images covers a region in view of the front-facing camera; and comparing the first front image to the first set of images. The method of comparing the first back image with the images in the database includes selecting a second set of images from the database based on the approximate location of the first front image, where the second set of images covers a region opposite to the approximate location of the first front image; and comparing the first back image to the second set of images.

The method of determining a second line connecting locations associated with the second front image and the second back image includes comparing the second front image with images in a database where the database stores image features of multiple locations of a venue, identifying approximate location of the second front image, comparing the second back image with the images in the database, identifying approximate location of the second back image, and determining the second line using the approximate location of the second front image and the approximate location of the second back image. The method further includes sending the estimated location to a positioning engine, and determining final location of the device using the estimated location at the positioning engine.

In another embodiment, a computer program product for determining location of a device has a non-transitory medium storing computer programs for execution by one or more computer systems. The computer program product includes code for activating a front-facing camera and a back-facing camera of the device, code for capturing a first pair of images from a first orientation using the front-facing camera and the back-facing camera, where the first pair of images includes a first front image and a first back image, code for monitoring the device being moved to a second orientation, code for capturing a second pair of images from the second orientation using the front-facing camera and the back-facing camera, where the second pair of images includes a second front image and a second back image, and code for determining a location of the device using the first pair of images and the second pair of images.

In yet another embodiment, a device includes one or more processors, a dual-camera assist module working with the one or more processors, and a memory configured to store a location of the device. The dual-camera assist module includes logic for activating a front-facing camera and a back-facing camera of the device, logic for capturing a first pair of images from a first orientation of the device using a front-facing camera and a back-facing camera, where the first pair of images includes a first front image and a first back image, logic for monitoring the device being moved to a second orientation, logic for capturing a second pair of images from the second orientation using the front-facing camera and the back-facing camera, where the second pair of images includes a second front image and a second back image, logic for determining a location of the device using the first pair of images and the second pair of images.

In yet another embodiment, a system for determining location of a device includes one or more processors, a dual-camera assist module configured to work with the one or more processors, and a memory configured to store the location of the device. The dual-camera assist module includes means for activating a front-facing camera and a back-facing camera of the device, means for capturing a first pair of images from a first orientation using the front-facing camera and the a back-facing camera, where the first pair of images includes a first front image and a first back image, means for monitoring the device being moved to a second orientation, means for capturing a second pair of images from the second orientation using the front-facing camera and the back-facing camera, where the second pair of images includes a second front image and a second back image, and means for determining a location of the device using the first pair of images and the second pair of images.

In yet another embodiment, a method for determining location of a device includes receiving a first pair of images captured from a first orientation of the device using a front-facing camera and a back-facing camera, where the first pair of images includes a first front image and a first back image, receiving a second pair of images captured from a second orientation of the device using the front-facing camera and the back-facing camera, where the second pair of images includes a second front image and a second back image, and determining a location of the device using the first pair of images and the second pair of images.

In yet another embodiment, a computer program product for determining location of a device includes a non-transitory medium storing computer programs for execution by one or more computer systems. The computer program product further includes code for receiving a first pair of images captured from a first orientation of the device using a front-facing camera and a back-facing camera, where the first pair of images includes a first front image and a first back image, code for receiving a second pair of images captured from a second orientation of the device using the front-facing camera and the back-facing camera, where the second pair of images includes a second front image and a second back image, and code for determining a location of the device using the first pair of images and the second pair of images.

In yet another embodiment, a server includes one or more processors, a dual-camera positioning module configured to work with the one or more processors, and a memory configured to store location of a device. The dual-camera positioning module includes logic for receiving a first pair of images captured from a first orientation of the device using a front-facing camera and a back-facing camera, where the first pair of images includes a first front image and a first back image, logic for receiving a second pair of images captured from a second orientation of the device using the front-facing camera and the back-facing camera, where the second pair of images includes a second front image and a second back image, and logic for determining a location of the device using the first pair of images and the second pair of images.

In yet another embodiment, a system for determining location of a device includes one or more processors, a dual-camera positioning module configured to work with the one or more processors, a memory configured to store the location of the device. The dual-camera positioning module includes means for receiving a first pair of images captured from a first orientation of the device using a front-facing camera and a back-facing camera, where the first pair of images includes a first front image and a first back image, means for receiving a second pair of images captured from a second orientation of the device using the front-facing camera and the back-facing camera, where the second pair of images includes a second front image and a second back image, means for determining a location of the device using the first pair of images and the second pair of images.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIG. 1 illustrates an exemplary method to define orientation of a device according to some aspects of the present disclosure.

FIG. 4 illustrates exemplary displays of images captured in FIG. 3 according to some aspects of the present disclosure.

FIGS. 7a-7b illustrate exemplary implementations of visual search functionality according to embodiments of the present disclosure.

DESCRIPTION OF EMBODIMENTS

Figure 2B:
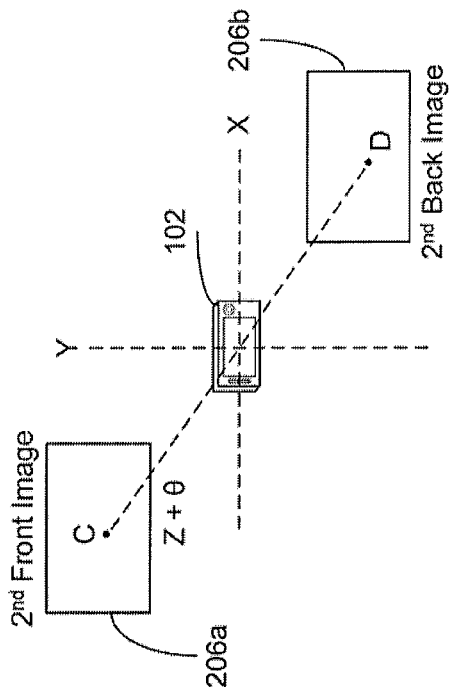
FIGS. 2a-2d illustrate methods of determining position of a device using opposing cameras according to some aspects of the present disclosure.

Embodiments of determining location of a device using opposing cameras are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

With new devices equipped with front and back cameras (also referred to as front-facing camera and back-facing camera), two images from the opposite scenes in a venue can be captured. Further, orientation (azimuth and elevation) of each of these images can be obtained from one or more sensors on the device. The present disclosure describes systems and methods that can be applied to determine position of a device based on two or more sets of dual-view images captured and tagged with orientation data. The methods take advantage of that the pairs of images are opposite to each other given the manner they are captured.

Orientation data of the device and the images captured can be used to optimize the visual search.

FIG. 1 illustrates an exemplary method of describing orientation of a device according to some aspects of the present disclosure. In the example shown in FIG. 1, orientation of a device 102 may be described in reference to a Cartesian coordinate having the X, Y, and Z axes. In some approaches, a particular reference point within the device may be used as the origin. The origin may be defined using a textual description or may be a mathematically unique point, such as the center of the display screen. Note that, other coordinate systems, such as the polar coordinate system and the spherical coordinate system may be employed to describe orientation of the device 102. According to embodiments of the present disclosure, the orientation of the device 102 may be approximately aligned to certain axis. For example, the device 102 in an upright position (indicated by arrow 104) may be approximately aligned to the Y axis and approximately perpendicular to the X-Z plane. A rotation, indicated by arrow 106, of the device 102 may substantially maintain the upright position of the device.

In some embodiments, when a user is on a slope or on a flight of stairs, the Y axis describing orientation of the device 102 may be approximately perpendicular to the slope, and the X-Z plane describing orientation of the device 102 may be approximately parallel to the slope.

According to embodiments of the present disclosure, various types of sensors, including but not limited to, accelerometer, gyroscope, and magnetometer may be used to detect motions and rotations of the device. The accelerometer may perform better in detecting linear movements, the gyroscope may perform better in detecting rotations, and the magnetometer may perform better in detecting orientations of the device. A combination of two or more such sensors may be used to detect movement, rotation, and orientation of the device according to aspects of the present disclosure.

According to embodiments of the present disclosure, an accelerometer is a device that measures the acceleration of the device. It measures the acceleration associated with the weight experienced by a test mass that resides in the frame of reference of the accelerometer. For example, an accelerometer measures a value even if it is stationary, because masses have weights, even though there is no change of velocity. The accelerometer measures weight per unit of mass, a quantity also known as gravitational force or g-force. In other words, by measuring weight, an accelerometer measures the acceleration of the free-fall reference frame (inertial reference frame) relative to itself. In one approach, a multi-axis accelerometer can be used to detect magnitude and direction of the proper acceleration (or g-force), as a vector quantity. In addition, the multi-axis accelerometer can be used to sense orientation as the direction of weight changes, coordinate acceleration as it produces g-force or a change in g-force, vibration, and shock. In another approach, a micro-machined accelerometer can be used to detect position, movement, and orientation of the device.

According to embodiments of the present disclosure, a gyroscope is used to measure rotation and orientation of the device, based on the principles of conservation of angular momentum. The accelerometer or magnetometer can be used to establish an initial reference for the gyroscope. After the initial reference is established, the gyroscope can be more accurate than the accelerometer or magnetometer in detecting rotation of the device because it is less impacted by vibrations, or by the electromagnet fields generated by electrical appliances around the device. A mechanical gyroscope can be a spinning wheel or disk whose axle is free to take any orientation. This orientation changes much less in response to a given external torque than it would without the large angular momentum associated with the gyroscope's high rate of spin. Since external torque is minimized by mounting the device in gimbals, its orientation remains nearly fixed, regardless of any motion of the platform on which it is mounted. In other approaches, gyroscopes based on other operating principles may also be used, such as the electronic, microchip-packaged Micro-electromechanical systems (MEMS) gyroscope devices, solid state ring lasers, fiber optic gyroscopes and quantum gyroscope.

According to embodiments of the present disclosure, a magnetometer can be used to measure orientations by detecting the strength or direction of magnetic fields around the device. Various types of magnetometers may be used. For example, a scalar magnetometer measures the total strength of the magnetic field it is subjected to, and a vector magnetometer measures the component of the magnetic field in a particular direction, relative to the spatial orientation of the device. In another approach, a solid-state Hall-effect magnetometer can be used. The Hall-effect magnetometer produces a voltage proportional to the applied magnetic field, and it can be configured to sense polarity.

Figure 2A:
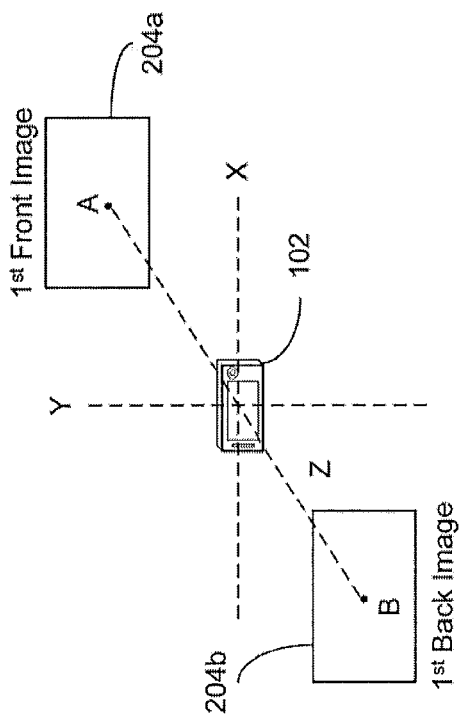

FIGS. 2a-2d illustrate methods of determining position of a device using opposing cameras according to some aspects of the present disclosure. In FIG. 2a, device 102 is oriented with respect to axes X, Y, and Z. It captures a first front image 204a and a first back image 204b. A is a point on the first front image 204a, and B is a point on the first back image 204b. A line joining point A and point B passes through the device 102. In FIG. 2b, the device 102 rotates by an angle θ with respect to the plane X-Z. It then captures a second front image 206a and a second back image 206b. C is a point on the second front image 206a, and D is a point on the second back image 206b. A line joining point C and point D passes through the device 102. Note that for better results, the device 102 can capture scenes at a distance, which are preferably not occluded by other objects or people.

Figure 2C:
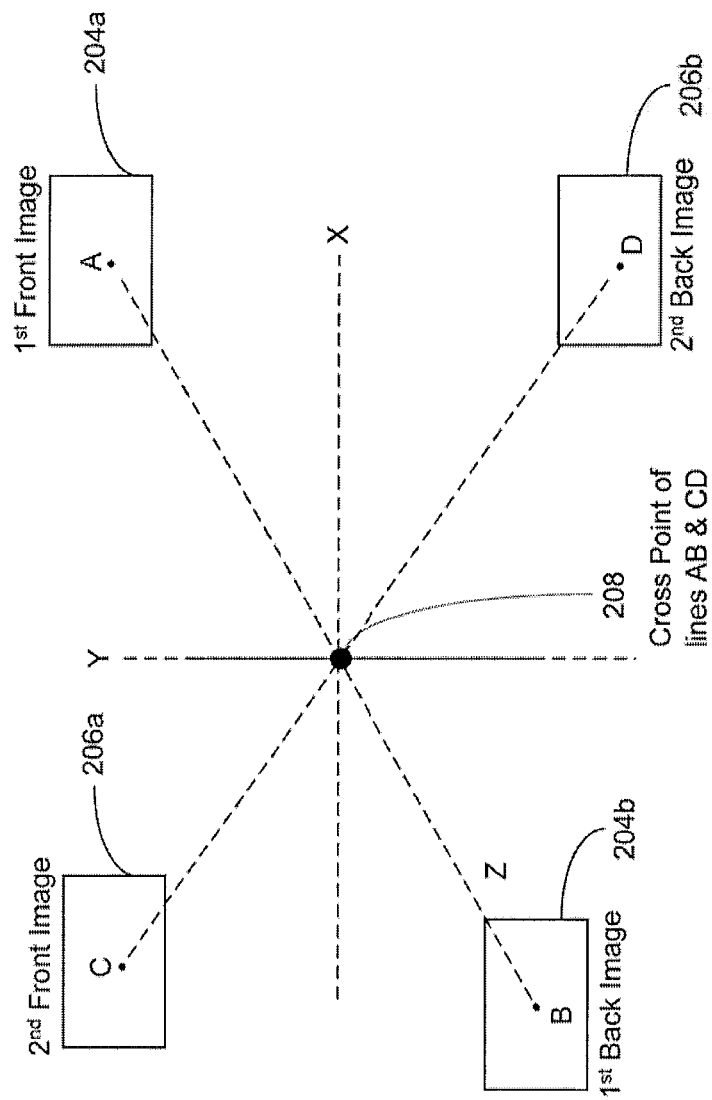

FIG. 2c illustrates a combined view of FIG. 2a and FIG. 2b. As shown in FIG. 2c, line AB joins the first front image 204a and the first back image 204b; line CD joins the second front image 206a and the second back image 206b. A cross point of lines AB and CD, indicated by dot 208, describes the location of the device 102 that captures the first pair of images, including the first front image 204a and the first back image 204b, and the second pair of images, including the second front image 206a and the second back image 206b. Note that in practice, the lines AB and CD may not exactly crossing each and the method computes an approximate cross point, taking into account of unintended movements of the device 102 in the capturing the images and in the rotation between capturing the first pair of images and the second pair of images.

According to embodiments of the present disclosure, by applying vision based matching, location of the scene in each image can be searched and located on a map. Then, using locations of the images captured, location of the device (also referred to as the user location) can be inferred as being along the line AB and CD that connects the centers of the positions of each pair of images. Then, position of the device can be determined as the cross point or section of the two lines on the map as shown in FIG. 2c.

Figure 2D:
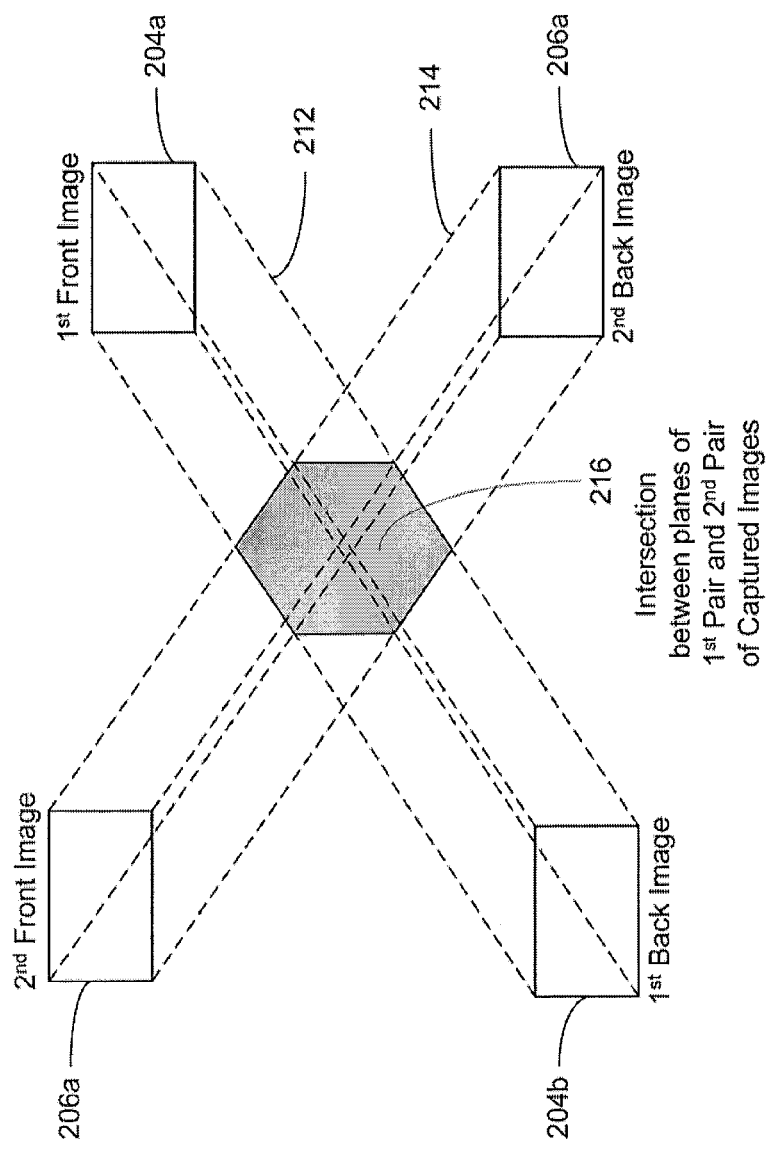

FIG. 2d illustrates another method of determining position of a device using opposing cameras according to some aspects of the present disclosure. The method of capturing two pair of images is similar to examples shown in FIG. 2a-2c to generate a first pair of images, including the first front image 204a and the first back image 204b, and a second pair of images, including the second front image 206a and the second back image 206b. In this example, instead of determining a point of intersection derived from two lines joining each pair of images, the method identifies a first set of planes 212 formed by joining the first pair of images, including the first front image 204a and the first back image 204b, and a second set of planes 214 formed by joining the second pair of images, including the second front image 206a and the second back image 206b. The intersection 216 of the first set of planes 212 and the second set of planes 214 may then be used to determine location of the device 102. Note that in the example shown in FIG. 2d, the intersection 216 may be extrapolated from feature points in different regions of the first front image 204a and the first back image 204b, and different regions of the second front image 206a and the second back image 206b. In other implementations, the intersection 216 may be extrapolated from feature points in one or more sub-regions of the first front image 204a and the first back image 204b, and one or more sub-regions of the second front image 206a and the second back image 206b. The one or more sub-regions may be obtained during an image matching process based on the key points identified using SIFT matched feature points.

As shown in FIGS. 2a-2d, methods for determining location of a device are described. With the front and back cameras, the method captures a first pair of images simultaneously or within a predetermined period of time in with a pipelined image capturing system. These images can capture the scenes of the venue which may be views at a distance from the camera and are not occluded by other objects or people. Applying a vision based search, location of the scene in each image can be identified and located on the map. The device (also referred to as the camera) and/or the user's location can be inferred to be along the line (2D map) or plane (3D map) that connects the centers of the two positions of the first pair of images. Next, the device is rotated with respect to the vertical axis and captures a second pair of opposite scenes. Again the user's location can be inferred as along the line that the centers of the two positions of the second pair of images. Camera and/or user's position can then be determined as the cross point or section of the two lines on the map.

Figure 3:
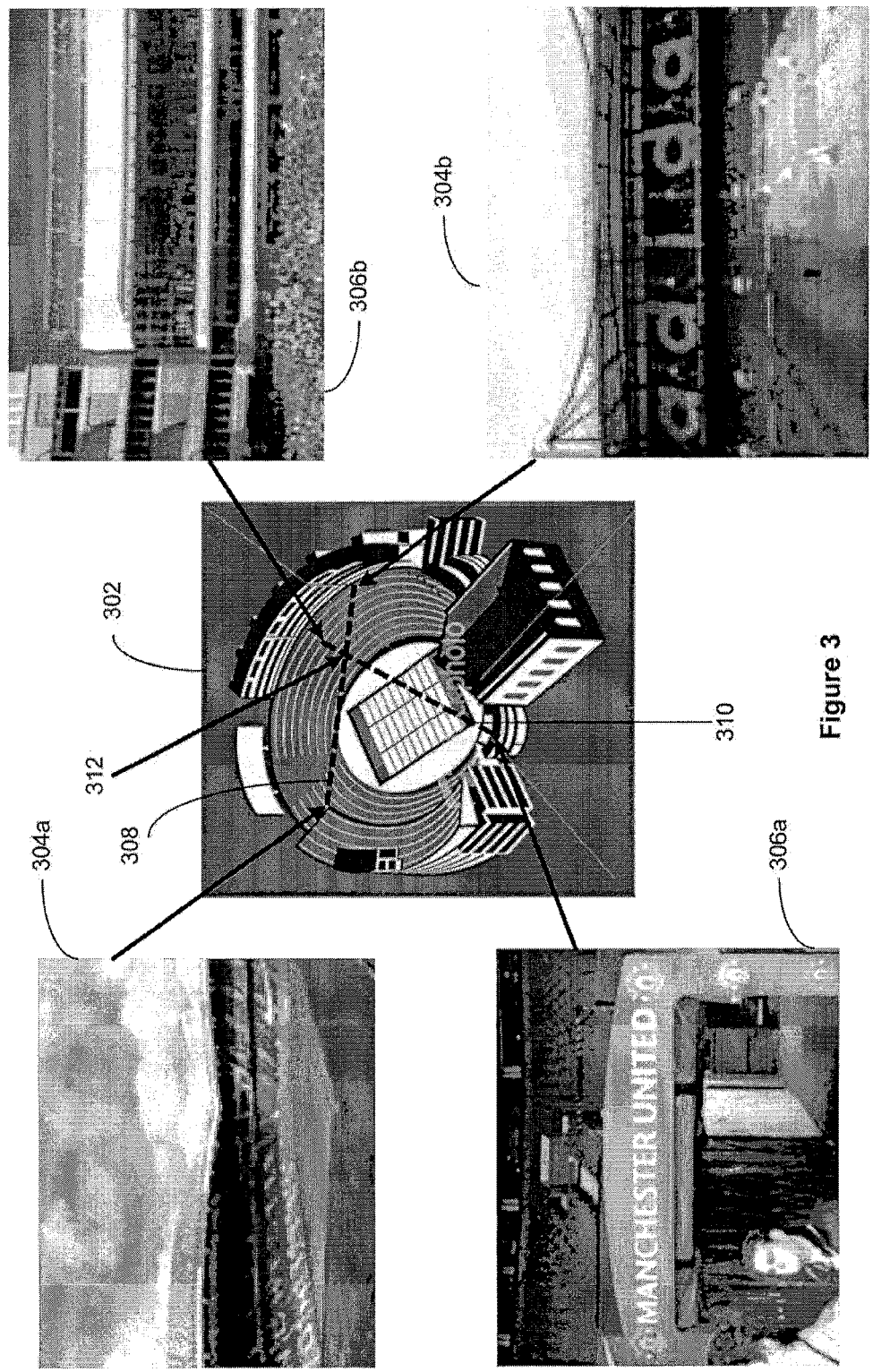
FIG. 3 illustrates an exemplary application using opposing cameras according to some aspects of the present disclosure.

FIG. 3 illustrates an exemplary application using opposing cameras according to some aspects of the present disclosure. In this example, a user may get lost and may need assistance in finding his seats in stadium 302. To do so, the user may apply the method described in FIG. 2a-2d using a mobile device. In this exemplary application, the mobile device may be configured to capture a first pair of images, namely 304a and 304b, from the user's current position. Next, the user may rotate the mobile device and take a second pair of images, namely 306a and 306b, from the user's current position. The two pairs of images are compared with known images of the stadium in a database. From the comparisons, the locations of each pair of images are determined. Based on the locations of the two pairs of images, the lines 308 and 310 that connect the two pairs of images are determined. Finally, the approximate cross point 312 of the lines 308 and 310 can be identified as the location of the mobile device. After location of the mobile device is identified, the information is used to create directions to the user to find his seat in the stadium.

FIG. 4 illustrates exemplary displays of images captured in FIG. 3 according to some aspects of the present disclosure. In the examples shown in FIG. 4, a first pair of images, including a first front image 404a and a first back image 404b captured by mobile device 402 are shown in a first display. The first display shows both the front view image 404a and the rear view image 404b captured by the front and back cameras of the mobile device respectively. In some implementations, the device may be configured to query a user to verify the first pair of images before capturing the second pair of images. In some other implementations, the device may be configured to request a user to capture the first pair of images again if the quality of the images captured may be improved or if a satisfactory match is not found between the captured image and images in the database after a predetermined period of time. Similarly, a second pair of images, including a second front image 406a and a second back image 406b captured by mobile device 402 is shown in a second display. The second display shows both the front view image 406a and the rear view image 406b captured by the front and back cameras of the mobile device respectively. In some implementations, the device may be configured to query the user to verify the second pair of images. In some other implementations, the device may be configured to request the user to capture the second pair of images again if the quality of the images captured may be improved or if a satisfactory match is not found between the captured image and images in the database after a predetermined period of time.

Figure 5A:
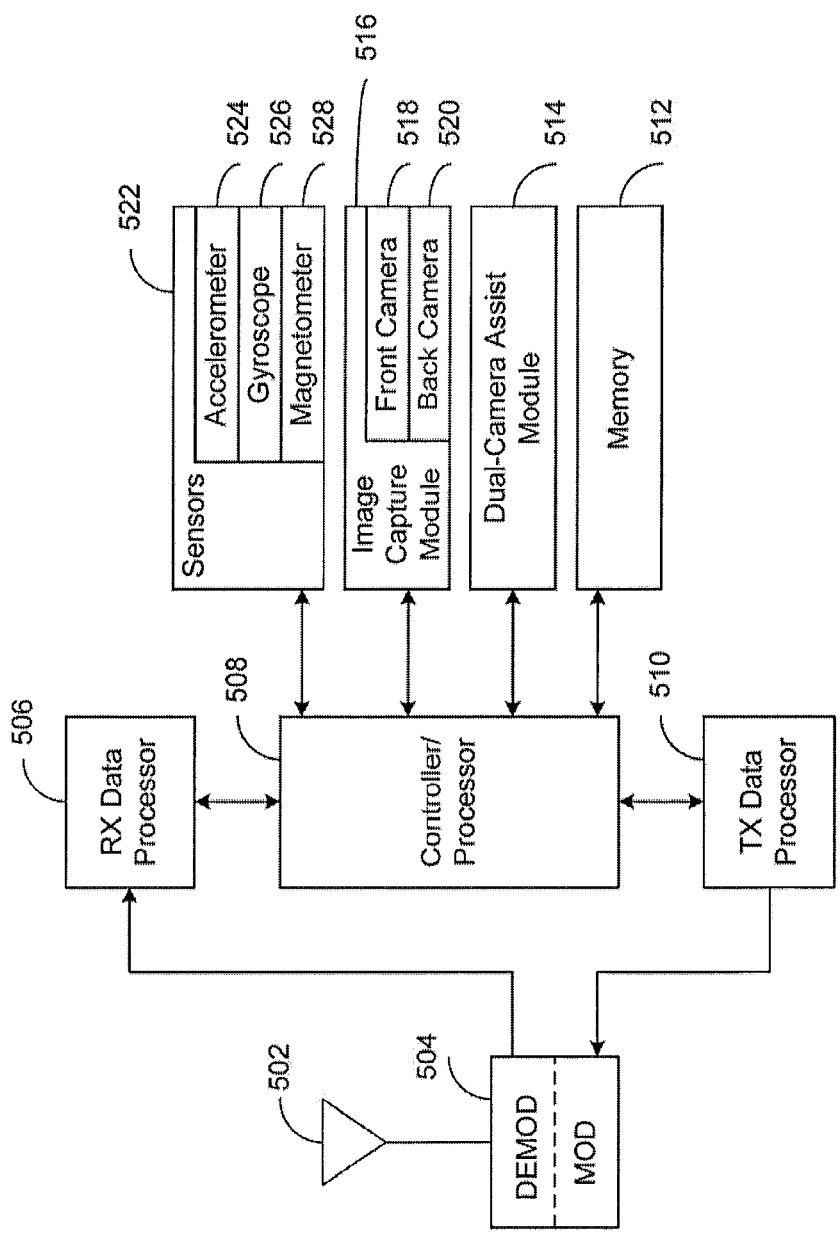
FIG. 5a illustrates a block diagram of an apparatus for determining position of a device according to some aspects of the present disclosure.

FIG. 5a illustrates a block diagram of an apparatus for determining position of a mobile device according to some aspects of the present disclosure. As shown in FIG. 5a, antenna 502 receives modulated signals from a base station and provides the received signals to a demodulator (DEMOD) part of a modem 504. The demodulator processes (e.g., conditions and digitizes) the received signal and obtains input samples. It further performs orthogonal frequency-division multiplexing (OFDM) demodulation on the input samples and provides frequency-domain received symbols for all subcarriers. An RX data processor 506 processes (e.g., symbol de-maps, de-interleaves, and decodes) the frequency-domain received symbols and provides decoded data to a controller/processor 508 of the mobile device.

The controller/processor 508 can be configured to control the mobile device to communicate with a server via a wireless network. A TX data processor 510 generates signaling symbols, data symbols, and pilot symbols, which can be processed by modulator (MOD) of modem 504 and transmitted via the antenna 502 to a base station. In addition, the controller/processor 508 directs the operation of various processing units at the mobile device. Memory 512 can be configured to store program codes and data for the mobile device. Image capture module 516 includes front camera 518 (also referred to as front-facing camera) and back camera 520 (also referred to as back-facing camera). The front camera 518 and back camera 520 can be configured to capture multiple sets of dual images. Sensors 522 include accelerometer 524, gyroscope 526, and magnetometer 528. The accelerometer 524, gyroscope 526, and/or magnetometer 528 can be configured to determine orientation of a mobile device. Dual-camera assist module 514 can be configured to implement methods of determining location of the mobile device using the multiple sets of dual images.

Figure 5B:
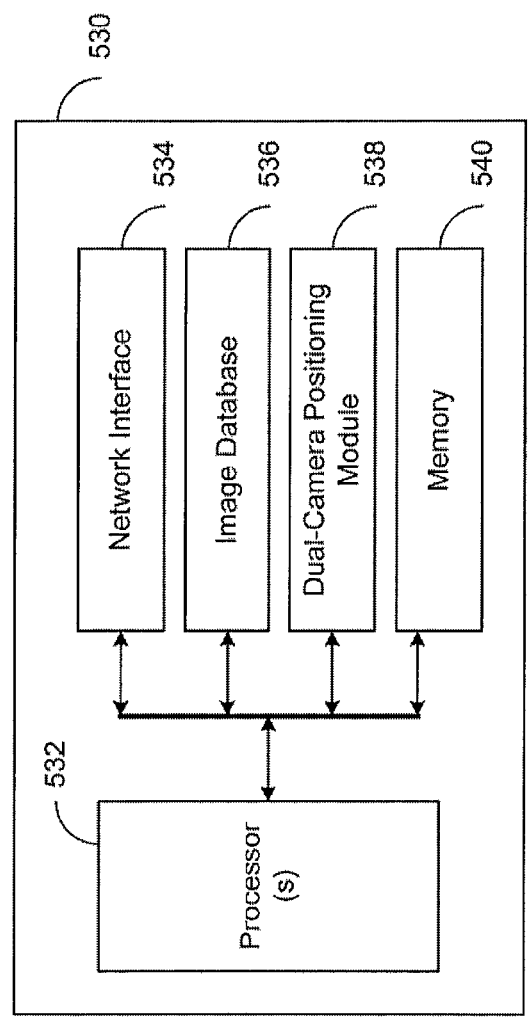
FIG. 5b illustrates a block diagram of a server for determining position of a device according to some aspects of the present disclosure.

FIG. 5b illustrates a block diagram of a server for determining position of a device according to some aspects of the present disclosure. In the example shown in FIG. 5b, server 530 includes one or more processors 532, network interface 534, database 536, dual-camera positioning module 538, and memory 540. The one or more processors 532 can be configured to control operations of the server 530. The network interface 534 can be configured to communicate with a network (not shown), which may be configured to communicate with other servers, computers, and mobile devices. The database 536 can be configured to store images of different venues, landmarks, maps, and other user-defined information. The dual-camera positioning module 538 can be configured to implement methods of determining location of a device using multiple sets of dual images. For example, the dual-camera positioning module 538 can be configured to implement methods described in FIG. 6b-6c and FIG. 7a-7b. In addition, the dual-camera positioning module 538 can be configured to control a device to perform the methods described in FIGS. 2a-2d and FIG. 6a. The memory 540 can be configured to store program codes and data for the server 530.

According to embodiments of the present disclosure, the database may be spatially organized. For each image, the camera orientation may be determined using sensors embedded in the camera. In searching the database, the method may initially focus on searching for images within a neighborhood of the camera's orientation. In another approach, the search may focus on matching features for an image captured with either the front or the back camera, and use the initial search result to assist subsequent searches of the database. In yet another approach, searching the database may be assisted by using approximate location information obtained from GPS, A-GPS, or Skyhook style WiFi position. In addition, if an image captured by the front camera is matched with an image A1 at location (x, y), then images that are in the proximity opposite to A1 are examined to search for a match with the image captured by the back camera, or vice versa. Note that from the image A1, the distance between the camera and a landmark shown in image A1 can be estimated, and this information can be used to further assist the search of the remaining images in the database to find a match of the image captured by the back camera. The various methods described above can be applied to improve the efficiency of searching images in the database.

According to embodiments of the present invention, a user may use one or more predefined gestures to trigger the dual-camera assist module for determining location of the mobile device. For example, the user may raise the camera straight up while inside a location based application to activate the dual-camera assist module. Note that raising the camera can allow the viewfinders to avoid occlusions. For another example, the user may shake the camera back-and-forth three times to activate the dual-camera assist module. After the dual-camera assist module is activated, position of the camera may be determined as described in association with FIG. 2 to FIG. 4 above.

Note that after the position of the camera has been determined, it can be communicated to a positioning engine either within the device or in a server resided in a remote location. The position may then be merged as an additional measurement to a particle or Kalman filter or as an individual fix based on implementation of the positioning engine. In one approach, a message may be passed from the camera module to the positioning engine that tags the message as a dual-camera fix, which may be treated as a high accuracy fix by the positioning engine.

Figure 6B:
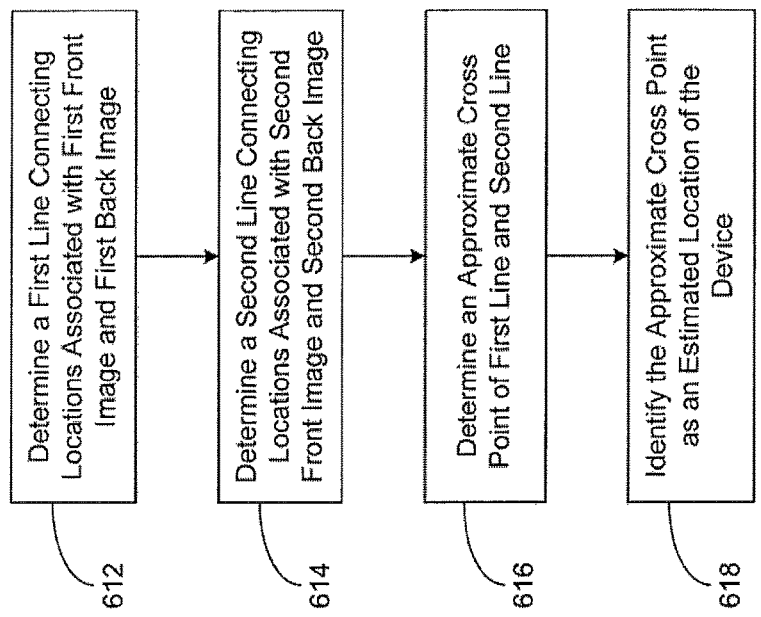
FIGS. 6a-6c illustrate exemplary flow charts implemented by the dual-camera assist module of FIG. 5 according to some aspects of the present disclosure.
Figure 6A:
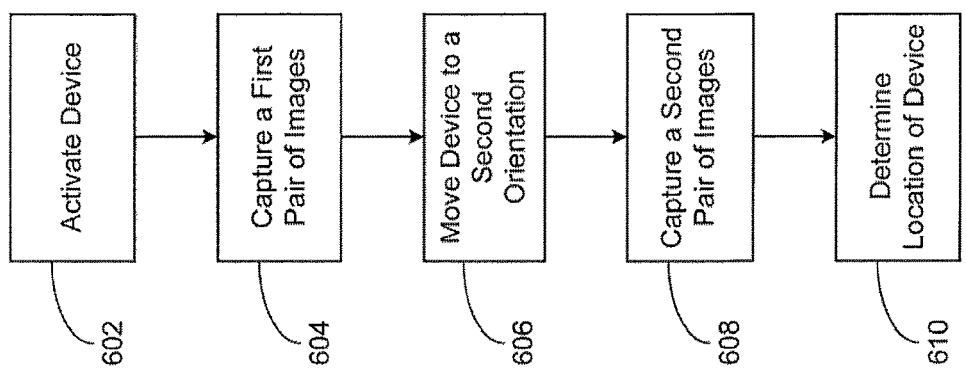

FIG. 6a illustrates an exemplary flow chart implemented by the dual-camera assist module of FIG. 5a according to some aspects of the present disclosure. In the exemplary implementation shown in FIG. 6a, in block 602, the module activates a front-facing camera and a back-facing camera of the device. In block 604, the module captures a first pair of images from a first orientation using the front-facing camera and the back-facing camera of a device, where the first pair of images includes a first front image and a first back image. In block 606, the module monitors the device being rotated to a second orientation. In block 610, the module captures a second pair of images from the second orientation using the front-facing camera and the back-facing camera, where the second pair of images includes a second front image and a second back image. In block 610, the module determines location of the device using the first pair of images and the second pair of images.

Note that the dual-camera assist module is configured to activate the front-facing camera and the back-facing camera of the device with a gesture, where the gesture may include applying one or more user-defined movements of the device. The first pair of images and the second pair of images may be captured simultaneously as well as within a predetermined period of time. Information of the first orientation and the second orientation of the device may be determined using at least one of accelerometer, gyroscope, and magnetometer.

According to embodiments of the present disclosure, block 610 may be implemented by blocks 612 to 618 as shown in FIG. 6b. In block 612, the dual-camera assist module determines a first line connecting locations associated with the first front image and the first back image. An example of locations associated with the first front image may be location of point A of the first front image 204a and location of point B of the first back image 204b as shown in FIG. 2a. In block 614, the module determines a second line connecting locations associated with the second front image and the second back image. An example of locations associated with the second front image may be location of point C of the second front image 206a and location of point D of the second back image 206b as shown in FIG. 2b. In block 616, the module determines an approximate cross point of the first line and the second line. In block 618, the module identifies the approximate cross point as an estimated location of the device.

Figure 6C:
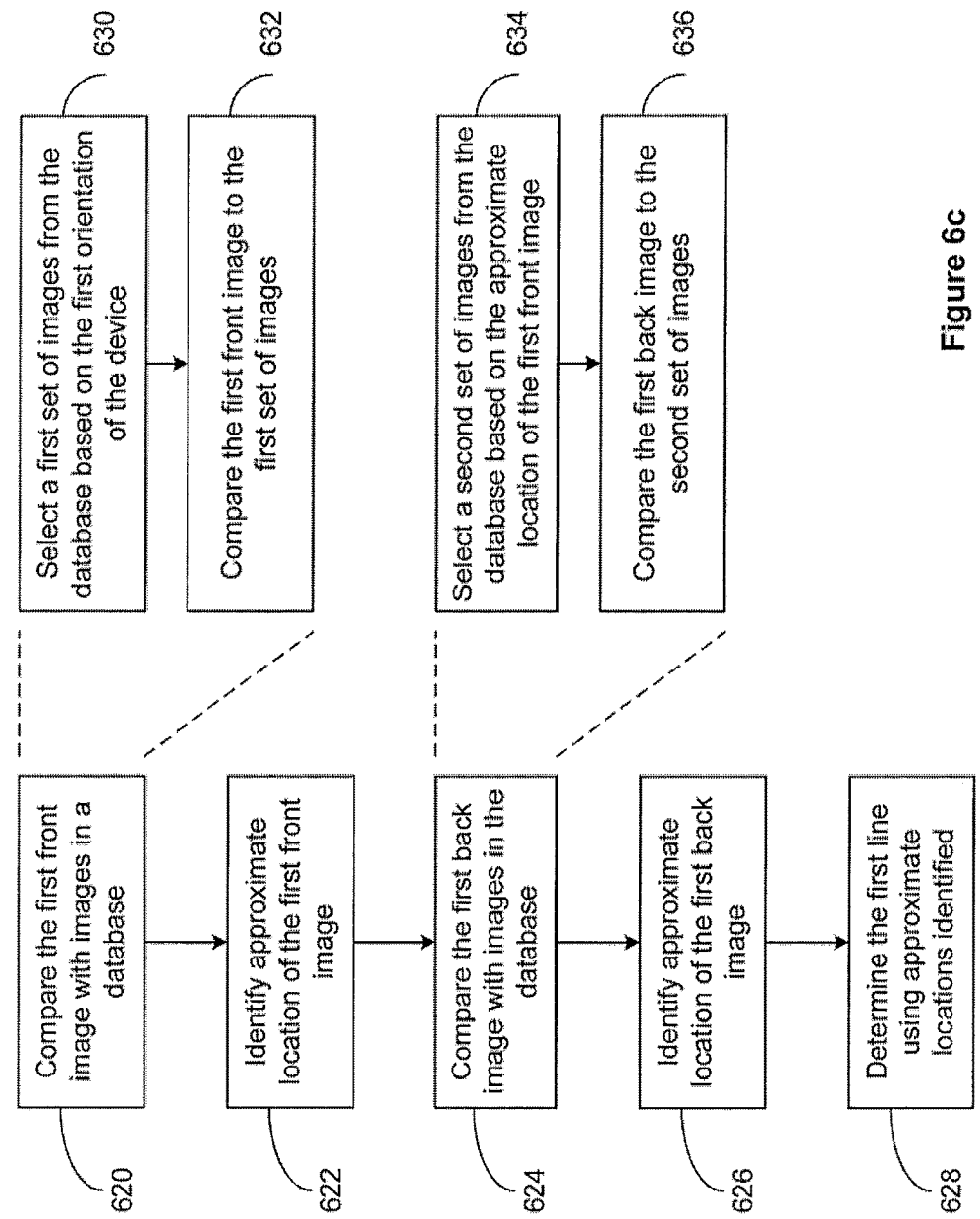

According to embodiments of the present disclosure, block 612 may be implemented by blocks 620-636 as shown in FIG. 6c. To determine a first line connecting locations associated with the first front image and the first back image, in block 620, the module may be configured to compare the first front image with images in a database that stores image features of multiple locations of a venue. In block 622, the module identifies approximate location of the first front image. In block 624, the module compares the first back image with the images in the database. In block 626, the module identifies approximate location of the first back image. In block 628, the module determines the first line using the approximate location of the first front image and the approximate location of the first back image.

In one approach, block 620 may include block 630 and block 632, and block 624 may include block 634 and block 636. To compare the first front image with images in a database, in block 30, the module selects a first set of images from the database based on the first orientation of the device, where the first set of images covers a region in view of the front-facing camera. In block 632, the module compares the first front image to the first set of images. Similarly, to compare the first back image with the images in the database, in block 634, the module selects a second set of images from the database based on the approximate location of the first front image, where the second set of images covers a region opposite to the approximate location of the first front image. In block 636, the method compares the first back image to the second set of images.

To determine a second line connecting the second front image and the second back image, the dual-camera assist module compares the second front image with images in a database, where the database stores image features of multiple locations of a venue, identifies approximate location of the second front image, compares the second back image with the images in the database, identifies approximate location of the second back image, and determines the second line using the approximate location of the second front image and the approximate location of the second back image.

According to embodiments of the present disclosure, to compare a query image with images in the database, local features (also referred to as descriptors) are extracted from the query image. The set of local features is used to assess the similarity between query and database images. To be useful for mobile applications, individual features may need to be robust against geometric and photometric distortions encountered when the user takes the query photo from a different viewpoint, and with different lighting compared to the corresponding database image. Next, query features are matched to features of images stored in the database. This can be accomplished by using special index structures, allowing fast access to lists of images containing matching features. Based on the number of features they have in common with the query image, a short list of potentially similar images is selected from the database. Finally, a geometric verification step is applied to the most similar matches in the database. Geometric verification finds a coherent spatial pattern between features of the query image and the features of the candidate database image to ensure that the match is correct.

As discussed above, after images of a venue are captured by a mobile device, they are compared to images in a database as a part of the visual search process. FIGS. 7a-7b illustrate exemplary implementations of visual search functionality according to embodiments of the present disclosure. Systems and methods described in the present disclosure may be implemented in a client and server environment as shown in FIG. 7a and FIG. 7b.

As shown in FIG. 7a, the system includes a mobile device 702 (for example a mobile phone equipped with dual cameras), a visual search server 704, and a wireless network 706. The mobile device 702 includes image capture module 703, image encoding module 705, and process and display results module 707. The visual search server 704 includes image decoding module 711, descriptor extraction module 713, descriptor matching module 715, search results module 717, and database 719. Components of the mobile device 702, the wireless network 706, and the visual search server 704 are communicatively coupled as shown in the flow diagram of FIG. 7a. The mobile device 702 analyzes the query image, extracts local image features (descriptors), and transmits feature data. The retrieval methods run on the visual search server 704 using the transmitted features as the query to perform the search.

In the example shown in FIG. 7b, the system includes a mobile device 722 (shown as a mobile phone), a visual search server 724, and a wireless network 726. The mobile device 722 includes image capture module 723, descriptor extraction module 725, descriptor encoding module 727, descriptor matching module 729, decision branch 731, process and display results module 733, and local database (DB) or cache 735. The visual search server 724 includes descriptor decoding module 741, descriptor matching module 743, search results module 745, and database 747. Components of the mobile device 722, the wireless network 726, and the visual search server 724 are communicatively coupled as shown in the flow diagram of FIG. 7b. The mobile device 722 maintains a cache of the database and performs image matching locally. In the event if a match is not found, the mobile device 722 sends a query request to the visual search server 724. In this manner, it further reduces the amount of data sent over the network.

In each case of FIG. 7a and FIG. 7b, the retrieval framework can adapt to stringent mobile system requirements. The processing on the mobile device may need to be fast and economical in terms of power consumption. The size of the data transmitted over the network may need to be as small as possible to minimize network latency and thus provide the best user experience. The methods used for retrieval may need to be scalable to potentially very large databases, and capable of delivering accurate results with low latency. Further, the retrieval system may need to be robust to allow reliable recognition of objects captured under a wide range of conditions, including different distances, viewing angles, and lighting conditions, or in the presence of partial occlusions or motion blur. In other embodiments, the whole system may reside on a mobile device, the functionalities of the visual search server and the database resided in the visual search server may be implemented in a mobile device. For example, the database of a venue may be downloaded to the mobile device, and functions performed by visual search server 704 described in FIG. 7a or functions performed by visual search server 724 described in FIG. 7b may be implemented in the mobile device.

The feature extraction process identifies salient interest points in the image. For robust image matching, such interest points may need to be repeatable under perspective transformations (such as scale changes, rotation, and translation) and lighting variations. To achieve scale invariance, interest points can be computed at multiple scales using an image pyramid. To achieve rotation invariance, the patch around each interest point is oriented in the direction of the dominant gradient. The gradients in each path are further normalized to make them robust to illumination changes.

Note that the different interest point detectors provide different trade-offs in repeatability and complexity. For example, the difference-of-Gaussian (DoG) points generated by SIFT can be slow to compute, but it can be highly repeatable; while a corner detector approach can be fast but it offers lower repeatability. Among various approaches that can achieve a good tradeoff between repeatability and complexity is a Hessian-blob detector sped up with integral images. Using this approach for VGA images, interest point detection can be carried out in approximately less than one second on some current mobile phones.

After interest point detection, "visual word" descriptors are computed using small image patches around such points. One challenge in computing feature descriptors is to make them highly discriminative of characteristic of an image or a small set of images. Descriptors that occur in almost every image (for example the equivalent of the word "and" in text documents) would not be useful for retrieval.

In one implementation, the process of computing the descriptor is described as follows:
  The patch is divided into several (for example 5 to 9) spatially localized bins;
  The joint (dx,dy) gradient histogram in each spatial bin is then computed. CHoG histogram binning exploits typical skew in gradient statistics that are observed for patches extracted around key points; and
  Histogram of gradients from each spatial bin is quantized and stored as part of the descriptor.

In the implementation above for extracting features of an image, interest points (e.g. corners, blobs) at different scales are extracted. The patches at different scales are oriented along the most dominant gradient. The descriptor is computed using canonically oriented and normalized patches. The patch is divided into localized spatial bins, and it gives robustness to interest point localization error. The distribution of gradients in each spatial bin is compressed directly to obtain a compact description of the patch.

The use of histograms allows information distance measures, such as KL-divergence to be employed for assessing degree of mismatch between image features. Histograms also allow simple and effective encoding. In some examples, only 50-60 bits may be needed to turn each patch into a compressed histogram-based descriptor.

Mobile visual search systems that transmit or store local image features may need to encode (and/or multiplex) sets of features and feature location information efficiently. Feature location information may also need to be encoded, as it is used for geometric verification. For matching accuracy, in one approach, hundreds of local features are usually used. Such features are usually highly correlated spatially. Encoding of feature location information can be accomplished by first quantizing it to a 2-D histogram, and then using context-based arithmetic coding technique to exploit spatial correlation. This technique can achieve about 5 bits/feature coding rate, while delivering sufficiently high precision of representation of feature location information.

The encoding of the entire set of local features and their corresponding locations can be accomplished by transmitting feature location histogram first, and then transmitting features in order, in which their locations appear in decoding the histogram. For example, if histogram indicates that block (x,y) includes three features, then the encoder can output codes of three corresponding descriptors sequentially in the bit stream.

For indexing and matching features of an image in a large database of images, the disclosed embodiments use a data structure that returns a shortlist of the database candidates that are likely to match the query image. The shortlist may contain false positives, as long as the correct match is included. Slower pair wise comparisons can subsequently be performed on just the shortlist of candidates rather than the entire database.

Various data structures can be employed for indexing local features in image database. One approach is to use approximate nearest neighbor (ANN) search of SIFT descriptors with a best-bin-first strategy. In addition, a Bag of Features (BoF) model may be used. The BoF codebook is constructed by k-means clustering of training set of descriptors. During a query, scoring the database images can be performed by using an inverted file index associated with the BoF codebook. To generate a large codebook, a hierarchical k-means clustering can be utilized to create a vocabulary tree (VT). Other search techniques, such as Locality-Sensitive Hashing (LSH), and improvements in traditional tree-based approaches can also be used.

Geometric verification is performed after feature matching. In this stage, location information of features in query and database images are used to confirm that the feature matches are consistent with a change in viewpoint between the two images. The geometric transform between query and database image is estimated using a regression techniques. The transformation is usually represented by the fundamental matrix which incorporates 3-D geometry, homography, or affine models.

Note that embodiment described hereinebelow, FIG. 3, FIG. 5a, FIGS. 6a-6c and their corresponding descriptions provide means for activating a front-facing camera and a back-facing camera of the device, means for capturing a first pair of images from a first orientation using the front-facing camera and the a back-facing camera of the device, means for monitoring the device being moved to a second orientation, means for capturing a second pair of images from the second orientation using the front-facing camera and the back-facing camera, and means for determining a location of the device using the first pair of images and the second pair of images. Embodiments descibed hereinbelow, FIGS. 2a-2d, FIG. 5a, FIGS. 6a-6c and their corresponding descriptions provide means for determining a first line connecting locations associated with the first front image and the first back image, means for determining a second line connecting locations associated with the second front image and the second back image, means for determining an approximate cross point of the first line and the second line, and means for identifying the approximate cross point as an estimated location of the device. Embodiments described hereinbelow, FIGS. 2a-2d, FIG. 5a, FIGS. 6a-6c, FIGS. 7a-7b and their corresponding descriptions provide means for comparing the first front image with images in a database, means for identifying approximate location of the first front image, means for comparing the first back image with the images in the database, means for identifying approximate location of the first back image, and means for determining the first line using the approximate location of the first front image and the approximate location of the first back image. Embodiments described hereinbelow, FIGS. 2a-2d, FIG. 4, FIG. 5a, FIGS. 6a-6c and their corresponding descriptions provide means for selecting a first set of images from the database based on the first orientation of the device, means for comparing the first front image to the first set of images, means for selecting a second set of images from the database based on the approximate location of the first front image, and means for comparing the first back image to the second set of images. Embodiments descibed hereinbelow, FIGS. 2a-2d, FIG. 5a, FIGS. 6a-6c, FIGS. 7a-7b and their corresponding descriptions provide means for comparing the second front image with images in a database where the database stores image features of multiple locations of a venue, means for identifying approximate location of the second front image, means for comparing the second back image with the images in the database, means for identifying approximate location of the second back image, and means for determining the second line using the approximate location of the second front image and the approximate location of the second back image. Note that embodiments described hereinbelow, FIG. 4, FIG. 5b, FIGS. 6a-6c, FIGS. 7a-7b and their corresponding descriptions provide means for receiving a first pair of images captured from a first orientation of the device using a front-facing camera and a back-facing camera, means for receiving a second pair of images captured from a second orientation of the device using the front-facing camera and the back-facing camera, and means for determining a location of the device using the first pair of images and the second pair of images.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method for determining location of a device, comprising:
    activating a front-facing camera and a back-facing camera of the device;
    capturing a first pair of images at a location of the device from a first orientation using the front-facing camera and the back-facing camera, the first pair of images comprising a first front image and a first back image;
    determining a second orientation;
    capturing a second pair of images at the location of the device from the second orientation using the front-facing camera and the back-facing camera, the second pair of images comprising a second front image and a second back image;
    identifying the first pair of images or the second pair of images, or both, the identifying to be initiated by searching for images in a locally cached database comprising spatially organized images of a venue, the identifying including matching the first image from the first pair of images with an image from the locally cached database followed by examination of one or more images from the locally cached database corresponding to locations opposite the matched first image to detect an image matching the second image from the first pair of images;
    determining a first line connecting locations associated with the first front image and the first back image, wherein determining the first line comprises:
        comparing the first front image with images in a database, wherein the database stores image features of multiple locations of the venue;
        identifying an approximate location of the first front image;
        comparing the first back image with the images in the database;
        identifying an approximate location of the first back image; and
        determining of the first line using the approximate location of the first front image and the approximate location of the first back image;
    determining a second line connecting locations associated with the second front image and the second back image;
    determining an approximate cross point of the first line and the second line; and
    identifying the approximate cross point as an estimated location of the device.

2. The method of claim 1, wherein activating a front-facing camera and a back-facing camera of the device comprises:
    activating the front-facing camera and the back-facing camera of the device with a gesture, wherein the gesture is to include applying one or more user-defined movements of the device.

3. The method of claim 1, wherein capturing the first pair of images comprises:
    capturing the first pair of images simultaneously.

4. The method of claim 1, wherein capturing the first pair of images further comprises:
    capturing the first pair of images within a predetermined period of time.

5. The method of claim 1, further comprising:
    determining the first orientation and the second orientation using an accelerometer, a gyroscope or a magnetometer, or a combination thereof.

6. The method of claim 1, wherein comparing the first front image with the images in the database comprises:
    selecting a first set of images from the database based on the first orientation of the device, wherein the first set of images covers a region in view of the front-facing camera; and
    comparing the first front image to the first set of images.

7. The method of claim 1, wherein comparing the first back image with the images in the database comprises:
    selecting a second set of images from the database based on the approximate location of the first front image, wherein the second set of images covers a region opposite to the approximate location of the first front image; and
    comparing the first back image to the second set of images.

8. The method of claim 1, wherein determining the second line connecting locations associated with the second front image and the second back image comprises:
    comparing the second front image with images in the database wherein the database stores image features of multiple locations of the venue;
    identifying an approximate location of the second front image;
    comparing the second back image with the images in the database;
    identifying an approximate location of the second back image; and
    determining the second line using the approximate location of the second front image and the approximate location of the second back image.

9. The method of claim 1, further comprising:
    determining, via a positioning engine at the mobile device, a final location of the device using the estimated location.

10. A computer program product to determine a location of a device, comprising a non-transitory medium storing computer programs for execution by one or more computer systems, the computer program product comprising:
    code to activate a front-facing camera and a back-facing camera of the device;
    code to capture a first pair of images at a location of the device from a first orientation using the front-facing camera and the back-facing camera, the first pair of images to comprise a first front image and a first back image;
    code to determine a second orientation of the device;
    code to capture a second pair of images at the location of the device from the second orientation using the front-facing camera and the back-facing camera, the second pair of images to comprise a second front image and a second back image;

code to identify the first pair of images or the second pair of images, or both, the code to identify to be initiated by searching for images in a locally cached database comprising spatially organized images of a venue, the code to identify to include code to detect a match between the first image from the first pair of images and an image from the locally cached database followed by examination of one or more images from the locally cached database corresponding to locations opposite the matched first image to detect an image that matches the second image from the first pair of images;

code to determine a first line connecting locations associated with the first front image and the first back image, wherein determining the first line comprises:
 code to compare the first front image with images in a database, wherein the database stores image features of multiple locations of the venue;
 code to identify an approximate location of the first front image;
 code to compare the first back image with the images in the database;
 code to identify an approximate location of the first back image; and
 code to determine of the first line using the approximate location of the first front image and the approximate location of the first back image;

code to determine a second line connecting locations associated with the second front image and the second back image;

code to determine an approximate cross point of the first line and the second line; and code to identify the approximate cross point as an estimated location of the device.

11. The computer program product of claim 10, wherein the code to activate a front-facing camera and a back-facing camera of the device comprises:
 code to activate the front-facing camera and the back-facing camera of the device with a gesture, wherein the gesture includes applying one or more user-defined movements of the device.

12. The computer program product of claim 10, wherein the code to capture a first pair of images comprises:
 code to capture the first pair of images simultaneously.

13. The computer program product of claim 10, wherein the code to capture a first pair of images further comprises:
 code to capture the first pair of images within a predetermined period of time.

14. The computer program product of claim 10, further comprising:
 code to determine the first orientation and the second orientation using an accelerometer, a gyroscope or a magnetometer, or a combination thereof.

15. The computer program product of claim 10, wherein the code to compare the first front image comprises:
 code to select a first set of images from the database based on the first orientation of the device, wherein the first set of images is to cover a region in view of the front-facing camera; and
 code to compare the first front image to the first set of images.

16. The computer program product of claim 10, wherein the code to compare the first back image comprises:
 code to select a second set of images from the database based on the approximate location of the first front image, wherein the second set of images covers a region opposite to the approximate location of the first front image; and
 code to compare the first back image to the second set of images.

17. The computer program product of claim 10, wherein the code to determine the second line to connect locations associated with the second front image and the second back image comprises:
 code to compare the second front image with images in the database wherein the database stores image features of multiple locations of the venue;
 code to identify an approximate location of the second front image;
 code to compare the second back image with the images in the database;
 code to identify an approximate location of the second back image; and
 code to determine the second line using the approximate location of the second front image and the approximate location of the second back image.

18. The computer program product of claim 10 further comprising:
 code to determine, at a positioning engine of the device, a final location of the device using the estimated location.

19. A device, comprising:
 one or more processors;
 a dual-camera assist module, coupled to the one or more processors, the dual-camera assist module to comprise:
  logic to activate a front-facing camera and a back-facing camera of the device;
  logic to capture a first pair of images at a location of the device from a first orientation of the device using a front-facing camera and a back-facing camera, the first pair of images to comprise a first front image and a first back image;
  logic to determine a second orientation;
  logic to capture a second pair of images at the location of the device from the second orientation using the front-facing camera and the back-facing camera, the second pair of images to comprise a second front image and a second back image;
  logic to identify the first pair of images or the second pair of images, or both, the logic to identify to initiate by searching for images in a locally cached database spatially organized images of a venue, the logic to identify to include logic to match a first image from the first pair of images with an image from the locally cached database followed by examination of one or more images from the locally cached database corresponding to locations opposite the matched first image to detect a match between a locally cached image and the second image from the first pair of images;
  logic to determine a first line connecting locations associated with the first front image and the first back image, wherein determining the first line comprises:
   logic to compare the first front image with images in a database, wherein the database stores image features of multiple locations of the venue;
   logic to identify an approximate location of the first front image;
   logic to compare the first back image with the images in the database;
   logic to identify an approximate location of the first back image; and
   logic to determine of the first line using the approximate location of the first front image and the approximate location of the first back image;

logic to determine a second line connecting locations associated with the second front image and the second back image;
logic to determine an approximate cross point of the first line and the second line; and
logic to identify the approximate cross point as an estimated location of the device.

20. The device of claim 19, wherein the logic to activate a front-facing camera and a back-facing camera of the device comprises:
logic to activate the front-facing camera and the back-facing camera of the device with a gesture, wherein the gesture includes applying one or more user-defined movements of the device.

21. The device of claim 19, wherein the logic to capture a first pair of images comprises:
logic to capture the first pair of images simultaneously.

22. The device of claim 19, wherein the logic to capture a first pair of images further comprises:
logic to capture the first pair of images within a predetermined period of time.

23. The device of claim 19, further comprising:
logic to determine the first orientation and the second orientation using an accelerometer, a gyroscope or a magnetometer, or a combination thereof.

24. The device of claim 19, wherein the logic to compare the first front image comprises:
logic to select a first set of images from the database based on the first orientation of the device, wherein the first set of images covers a region in view of the front-facing camera; and
logic to compare the first front image to the first set of images.

25. The device of claim 19, wherein the logic to compare the first back image comprises:
logic to select a second set of images from the database based on the approximate location of the first front image, wherein the second set of images is to cover a region opposite to the approximate location of the first front image; and
logic to compare the first back image to the second set of images.

26. The device of claim 19, wherein the logic to determine the second line to connect locations associated with the second front image and the second back image comprises:
logic to compare the second front image with images in the database wherein the database stores image features of multiple locations of the venue;
logic to identify an approximate location of the second front image;
logic to compare the second back image with the images in the database;
logic to identify an approximate location of the second back image; and
logic to determine the second line using the approximate location of the second front image and the approximate location of the second back image.

27. The device of claim 19, further comprising:
logic to determine, via a positioning engine at the device, a final location of the device using the estimated location.

28. The device of claim 19, further comprising:
logic to obtain a signal indicating verification of the first pair of images prior to capturing the second pair of images.

29. The device of claim 19, further comprising:
logic to indicate a request to repeat capture of the first pair of images based, at least in part, on a quality of the first pair of images or and absence of a satisfactory match between the captured first pair of images and one or more images in the database, or a combination thereof.

30. A system for determining location of a device, comprising:
one or more processors;
a dual-camera assist module, to operate with the one or more processors, the dual-camera assist module comprising:
means for activating a front-facing camera and a back-facing camera of the device;
means for capturing at a location of the device a first pair of images from a first orientation using the front-facing camera and the a back-facing camera, the first pair of images to comprise a first front image and a first back image;
means for determining a second orientation of the device;
means for capturing at the location of the device a second pair of images from the second orientation using the front-facing camera and the back-facing camera, the second pair of images to comprise a second front image and a second back image;
means for identifying the first pair of images or the second pair of images, or both, the means for identifying to be initiated by searching for images in a locally cached database comprising spatially organized images of a venue, the means for identifying including means for matching a first image from the first pair of images with an image from the locally cached database followed by examination of one or more images from the locally cached database corresponding to locations opposite the matched first image to detect an image matching the second image from the first pair of images; and
means for determining the location of the device based, at least in part, on an intersection of first and second planes;
means for to determining a first line connecting locations associated with the first front image and the first back image, wherein means for determining the first line comprises:
means for comparing the first front image with images in a database, wherein the database stores image features of multiple locations of the venue;
means for identifying an approximate location of the first front image;
means for comparing the first back image with the images in the database;
means for identifying an approximate location of the first back image; and
means for determining of the first line using the approximate location of the first front image and the approximate location of the first back image;
means for determining a second line connecting locations associated with the second front image and the second back image;
means for determining an approximate cross point of the first line and the second line; and
means for identifying the approximate cross point as an estimated location of the device.

31. The system of claim 30, wherein means for comparing the first front image comprises:

means for selecting a first set of images from the database based on the first orientation of the device, wherein the first set of images covers a region in view of the front-facing camera; and means for comparing the first front image to the first set of images.

32. The system of claim 30, wherein means for comparing the first back image comprises:

means for selecting a second set of images from the database based on the approximate location of the first front image, wherein the second set of images covers a region opposite to the approximate location of the first front image; and means for comparing the first back image to the second set of images.

33. The system of claim 30, wherein means for determining a second line comprises:

means for comparing the second front image with images in the database wherein the database stores image features of multiple locations of the venue;

means for identifying an approximate location of the second front image;

means for comparing the second back image with the images in the database;

means for identifying an approximate location of the second back image; and means for determining the second line using the approximate location of the second front image and the approximate location of the second back image.

34. A method for determining location of a device, comprising:

activating a front-facing camera and a back-facing camera of the device;

obtaining a first pair of images captured at a location of the device from a first orientation of the device using a front-facing camera and a back-facing camera, the first pair of images comprises a first front image and a first back image;

obtaining a second pair of images captured at the location of the device from a second orientation of the device using the front-facing camera and the back-facing camera, the second pair of images comprises a second front image and a second back image;

identifying the first pair of images or the second pair of images, or both, wherein the identifying is to be initiated by searching for images in a locally cached database comprising spatially organized images of a venue, the identifying including matching a first image from the first pair of images with an image from the locally cached database followed by examination of one or more images from the locally cached database corresponding to locations opposite the matched first image to detect an image matching the second image from the first pair of images;

determining a first line connecting locations associated with the first front image and the first back image, wherein determining the first line comprises:

comparing the first front image with images in a database, wherein the database stores image features of multiple locations of the venue;

identifying an approximate location of the first front image;

comparing the first back image with the images in the database;

identifying an approximate location of the first back image; and determining of the first line using the approximate location of the first front image and the approximate location of the first back image;

determining a second line connecting locations associated with the second front image and the second back image;

determining an approximate cross point of the first line and the second line; and identifying the approximate cross point as an estimated location of the device.

35. A computer program product for determining location of a device, comprising a non-transitory medium storing computer programs for execution by one or more computer systems, the computer program product comprising:

code to activate a front-facing camera and a back-facing camera of the device;

code to obtain a first pair of images captured at a location of the device from a first orientation of the device using a front-facing camera and a back-facing camera, the first pair of images to comprise a first front image and a first back image;

code to obtain a second pair of images captured at the location of the device from a second orientation of the device using the front-facing camera and the back-facing camera, the second pair of images to comprise a second front image and a second back image;

code to identify the first pair of images or the second pair of images, or both, the code to identify to be initiated by searching for images in a locally cached database comprising spatially organized images of a venue, the code to identify to include code to detect a match between the first image from the first pair of images and an image from the locally cached database followed by examination of one or more images from the locally cached database corresponding to locations opposite the matched first image to detect an image that matches the second image from the first pair of images;

code to determine a first line connecting locations associated with the first front image and the first back image, wherein determining the first line comprises:

code to compare the first front image with images in a database, wherein the database stores image features of multiple locations of the venue;

code to identify an approximate location of the first front image;

code to compare the first back image with the images in the database;

code to identify an approximate location of the first back image; and code to determine of the first line using the approximate location of the first front image and the approximate location of the first back image;

code to determine a second line connecting locations associated with the second front image and the second back image;

code to determine an approximate cross point of the first line and the second line; and code to identify the approximate cross point as an estimated location of the device.

36. A server, comprising:

one or more processors;

a dual-camera positioning module configured to operate with the one or more processors, the dual-camera positioning module comprising:

logic to obtain a first pair of images captured at a location of a device from a first orientation of the device using a front-facing camera and a back-facing camera, the first pair of images to comprise a first front image and a first back image;

logic to obtain a second pair of images captured at the location of the device from a second orientation of the device using the front-facing camera and the back-facing camera, the second pair of images to comprise a second front image and a second back image;

logic to identify the first pair of images or the second pair of images, or both, the logic to identify to be initiated by searching for images in a locally cached database comprising spatially organized images of a venue, the logic to identify to include logic to match a first image from the first pair of images with an image from the locally cached database followed by examination of one or more images from the locally cached database corresponding to locations opposite the matched first image to detect a match between a locally cached image and the second image from the first pair of images;

logic to determine a first line connecting locations associated with the first front image and the first back image, wherein determining the first line comprises:
 logic to compare the first front image with images in a database, wherein the database stores image features of multiple locations of the venue;
 logic to identify an approximate location of the first front image;
 logic to compare the first back image with the images in the database;
 logic to identify an approximate location of the first back image; and
 logic to determine of the first line using the approximate location of the first front image and the approximate location of the first back image;

logic to determine a second line connecting locations associated with the second front image and the second back image;

logic to determine an approximate cross point of the first line and the second line; and logic to identify the approximate cross point as an estimated location of the device.

37. A system for determining location of a device, comprising:
 one or more processors;
 a dual-camera positioning module configured to operate with the one or more processors, the dual-camera positioning module to comprise:
  means for obtaining a first pair of images captured at a location of the device from a first orientation of the device using a front-facing camera and a back-facing camera, the first pair of images to comprise a first front image and a first back image;
  means for obtaining a second pair of images captured at the location of the device from a second orientation of the device using the front-facing camera and the back-facing camera, the second pair of images to comprise a second front image and a second back image;
  means for identifying the first pair of images or the second pair of images, or both, the means for identifying to initiate by searching for images in a locally cached database comprising spatially organized images of a venue, the means for identifying to include logic to match a first image from the first pair of images with an image from the locally cached database followed by examination of one or more images from the locally cached database corresponding to locations opposite the matched first image to detect a match between a locally cached image and the second image from the first pair of images;
  means for determining a first line connecting locations associated with the first front image and the first back image, wherein determining the first line comprises:
   means for comparing the first front image with images in a database, wherein the database stores image features of multiple locations of the venue;
   means for identifying an approximate location of the first front image;
   means for comparing the first back image with the images in the database;
   means for identifying an approximate location of the first back image; and
   means for determining of the first line using the approximate location of the first front image and the approximate location of the first back image;
  means for determining a second line connecting locations associated with the second front image and the second back image;
  means for determining an approximate cross point of the first line and the second line; and
  means for identifying the approximate cross point as an estimated location of the device.

* * * * *